United States Patent [19]
Ellis et al.

[11] Patent Number: 5,437,709
[45] Date of Patent: Aug. 1, 1995

[54] RECYCLING OF RARE EARTH METALS FROM RARE EARTH-TRANSITION METAL ALLOY SCRAP BY LIQUID METAL EXTRACTION

[75] Inventors: Timothy W. Ellis; Frederick A. Schmidt, both of Ames, Iowa

[73] Assignee: Iowa State University Research Foundation, Inc., Ames, Iowa

[21] Appl. No.: 280,440

[22] Filed: Jul. 26, 1994

[51] Int. Cl.$^6$ .............................. C01F 17/00
[52] U.S. Cl. .......................... 75/581; 75/594
[58] Field of Search ............................. 75/594, 581

[56] References Cited

U.S. PATENT DOCUMENTS

| | | | |
|---|---|---|---|
| 3,634,066 | 1/1972 | Matthews | 75/594 |
| 5,129,945 | 7/1992 | Lyman et al. | 75/416 |
| 5,238,489 | 8/1993 | Lyman et al. | 75/743 |

OTHER PUBLICATIONS

Fe-Mg (Iron-Magnesium); Binary Alloy Phase Diagrams, 1985 pp. 1076–1077, Nayeb-Hashemi, et al.
Fe-Mo (Iron-Molybdenum); Binary Alloy Phase Diagrams, 1982 p. 1079, Guillermet.
General Alloying Theory, Section II-1, Rare Earth Alloys, 1961, 69–80, 132–135 and 199–212, Gschneidner, Jr.

*Primary Examiner*—Peter D. Rosenberg
*Attorney, Agent, or Firm*—Edward J. Timmer

[57] ABSTRACT

Method of treating rare earth metal-bearing scrap, waste or other material (e.g. Nd—Fe—B or Dy—Tb—Fe scrap) to recover the rare earth metal comprising melting the rare earth metal-bearing material, melting a Group IIA metal extractant, such as Mg, Ca, or Ba, in which the rare earth is soluble in the molten state, and contacting the melted material and melted extractant at a temperature and for a time effective to extract the rare earth from the melted material into the melted extractant. The rare earth metal is separated from the extractant metal by vacuum sublimation or distillation.

12 Claims, 1 Drawing Sheet

RECYCLING OF RARE EARTH METALS FROM RARE EARTH-TRANSITION METAL ALLOY SCRAP BY LIQUID METAL EXTRACTION

CONTRACTUAL ORIGIN OF THE INVENTION

The United States Government has rights in this invention pursuant to Contract No. W-7405-ENG-82 between the U.S. Department of Energy and Iowa State University, Ames, Iowa, which contract grants to Iowa State University Research Foundation, Inc. the right to apply for this patent.

FIELD OF THE INVENTION

The present invention relates to a liquid metal extraction treatment of rare earth-transition metal alloy scrap, waste or other material to recover the rare earth metal component and recycle the liquid metal extractant.

BACKGROUND OF THE INVENTION

As a result of the expanding use of rare earth-bearing materials in modern technology, such as, for example, in the form of rare earth-iron alloy magnetostrictive transducers, delay lines, variable frequency resonators and filters and rare earth-iron-boron alloy permanent magnets, the cost and environmental problems associated with their waste and scrap disposal have become an increasing concern. Additionally, the high cost of rare earth metals makes simple disposal of rare earth-bearing waste or scrap materials economically unattractive. Up to the present time, there have been no large scale operations to recover rare earth metals from scrap and waste materials.

One attempt at recovering rare earth metals from waste and scrap involves dissolution of the waste/scrap material in acid media followed by precipitation of a rare earth compound. The rare earth compound is converted to a rare earth trifluoride which is then reduced to rare earth metal by calcium reduction. U.S. Pat. No. 5,129,945 describes a recovery process of this type. Although the recovery process is effective, it is time consuming and requires the use of expensive non-recoverable reagents.

Another more recent attempt at recovering rare earth metals from rare earth-transition metal materials has produced a process that promises to be less costly and more adaptable to a variety of scrap materials. This process is based on liquid-liquid or liquid-solid extraction technology depending upon the specific rare earth alloy scrap being processed. The process allows rare earth recovery without the expensive and time consuming acid digestion and fluoride reduction steps employed in the recovery process described in the preceding paragraph. Rare earth metals are recovered in this process using reagents which are essentially completely recycled. Thus, the waste stream is kept to a minimum. U.S. Pat. No. 5,238,489 describes a recovery process employing a combination of leaching and flotation to separate different rare earth scrap alloys in a scrap mixture from one another.

An object of the invention is to provide a liquid metal extraction process for recovering one or more rare earth metals from rare earth metal-bearing waste, scrap and other material in order to recover the rare earth metal component for reuse.

Another object of the invention is to provide a liquid metal extraction process for recovering one or more rare earth metals from rare earth metal-bearing waste, scrap and other material in a manner to recycle the liquid metal extractant in the recovery process.

SUMMARY OF THE INVENTION

The present invention provides a method of treating a rare earth metal-bearing material involving melting the rare earth metal-bearing material, melting an extractant, such as, for example, including, but not limited to, Mg, Ca, Ba, or other Group IIA metal in which the rare earth is soluble in the molten state, and contacting the melted rare earth metal-bearing material and melted extractant at a temperature and time effective to extract the rare earth metal from the melted alloy into the melted extractant. The rare earth metal then can be separated from the extractant for recycling of the rare earth metal and reuse of the extractant in the treatment process.

In one embodiment of the invention, the rare earth metal-bearing material and the extractant are melted and contacted in a common melting vessel. The melted material and extractant, such as molten magnesium, are contacted at a temperature and time sufficient to extract the rare earth metal from the melted material into the melted extractant. The melted material then is solidified and treated to separate the rare earth metal from the extractant to enable reuse of the rare earth metal and recycling of the extractant in the process. For example, the solidified material can be subjected to vacuum sublimation or distillation to separate the lower vapor pressure metal from the higher vapor pressure metal.

The present invention is useful, although not limited to, treating rare earth-transition metal (e.g. Fe) alloy scrap or waste material to extract the rare earth metal from the melted alloy into the melted extractant. The rare earth-iron alloy may comprise Dy and Tb (e.g. $Dy_{0.25}Tb_{0.75}Fe$ known as Terfenol alloy) or Nd (e.g. $Nd_2Fe_{14}B$ permanent magnet alloy). The rare earth metal is extracted from the alloy into the magnesium extractant in the form a magnesium-iron alloy that can be treated by vacuum sublimation or distillation to separate the rare earth from the magnesium extractant.

The present invention will become more readily understood from the following detailed description taken with the drawings.

DESCRIPTION OF THE INVENTION

Figure 1:
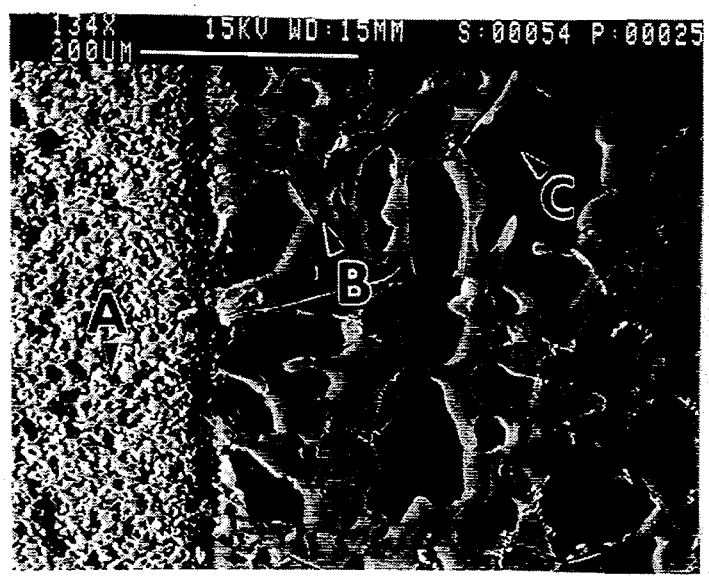
FIG. 1 is a photomicrograph at 134X of a Nd—Fe—B alloy material (e.g. $Nd_2Fe_{14}B$) cooled to room temperature after liquid metal extraction with molten magnesium at 1000° C. for 3 hours.

The present invention involves a liquid metal extraction technique for treating rare earth metal-bearing scrap, waste, and other material to recover one or more rare earth metals for reuse. Also, the present invention involves recovering the rare earth metal(s) in the liquid metal extractant in a manner that permits reuse or recycling of the extractant in the recovery process so as to reduce or minimize waste stream effects. The present invention is useful, although not limited to, treating rare earth metal-transition metal alloy scrap or waste material to extract one or more rare earth metals from the melted alloy into the liquid metal extractant. For example, illustrative alloys include rare earth-iron alloys that include Dy and Tb (e.g. $Dy_{0.25}Tb_{0.75}Fe$ known as Terfenol alloy) or rare earth-iron-boron alloys that include Nd (e.g. $Nd_2Fe_{14}B$ permanent magnet alloy). These alloys are offered merely for purposes of illustration and not limitation as the present invention can be practiced to recover one or more rare earth metals from a wide variety of rare earth metal-bearing scrap, waste, and other materials. For example, the present invention can be used to treat a wide variety of binary, ternary, and other rare earth-transition metal alloy compositions.

In accordance with the present invention, the rare earth metal-bearing material is treated by liquid metal extraction to remove the rare earth metal(s) from the material to the liquid metal extractant in which the rare earth metal(s) exhibit solubility in the molten state; i.e. when the molten rare earth metal-bearing material and molten extractant are in contact at elevated temperature for sufficient time, the rare earth metal(s) dissolves as a solute in the molten extractant as a solvent.

In practicing an embodiment of the invention, the method comprises melting the rare earth metal-bearing material, such as rare earth-transition metal alloy scrap, waste or other material from which the rare earth(s) is/are to be recovered, melting a metal extractant, and contacting the melted rare earth metal-bearing material and melted liquid metal extractant at a temperature and for time to extract the rare earth metal(s) from the melted alloy into the melted extractant.

Rare earth-bearing scrap or waste material typically will comprises scrap or waste generated by one or more fabricating operations, either on-site or off-site. The scrap or waste may be segregated (graded) optionally by the alloy composition, size, shape, and other factors. For example, fine pyrolytic rare earth-transition metal dust or powder (referred to as swarf) of like or similar composition can be segregated for treatment whereas dry, bulky scrap or waste pieces of the same or similar composition can be segregated into one or more groups by size and shape for treatment.

Swarf typically will comprise fine powder or particulates in the particle size range of less than 50 microns produced by such fabrication operations as abrasive cutting and grinding. Both swarf and bulky scrap or waste pieces may be treated in the as-received condition; i.e. without cleaning. If desired, bulky scrap pieces optionally may be ground in suitable manner into particulates form (e.g. particles sizes of less than 500 microns) to improve dissolution kinetics during treatment.

Although not so limited, the present invention can be used to treat a wide variety of binary, ternary, and other rare earth-transition metal alloy compositions. For purposes of illustration and not limitation, rare earth-transition metal scrap, waste and other material (e.g $Nd_2Fe_{14}B$, $CoNi_5$, etc.) treatable in accordance with the invention typically will comprise one or more transition metals such as Fe, Co, Ni, etc., one or more rare earth metals such as Nd, Dy, Tb, Pr, Sm, Ho, La, Ce, Eu, Gd, Er, Tm, Tb, Lu, Y, and Sc, and other optional alloyants such as B, Zn, Nb, Ga, Al as well as other non-metallics and metallics that may be used for one reason or another in the alloy composition.

The rare earth metal-bearing scrap, waste and other material may include a mixture of different rare earth-transition metal alloy scrap or waste materials (i.e. having different compositions) resulting, for example, from fabrication operations used to form permanent magnets and other articles of manufacture. An illustrative mixed rare earth metal-bearing material might include, for example, $Nd_2Fe_{14}B$ permanent magnet scrap or waste particulates, $SmCO_5$ permanent magnet scrap or waste particulates, and SiC and/or $Al_2O_3$ particulates grinding media. Such a mixture of scrap and waste particulates typically is received covered with residual water-soluble organic oils and/or coolant which are employed in the previous fabrication operations (e.g. abrasive grinding and cutting). Such mixtures of scrap and waste material can be cleaned prior to the liquid metal extraction treatment pursuant to the present invention, although cleaning is optional in practicing the invention.

Liquid metal extractants useful in practicing the present invention preferably are selected from the Group IIA metals of the Periodic Table including, but not limited to, Mg, Ca, Ba, and others in which the rare earth metal(s) to be recovered is/are soluble in the molten state under appropriate temperature and contact time parameters; i.e. when the molten material and molten extractant are in contact at elevated temperature for sufficient time, the rare earth metal(s) will dissolve as a solute in the molten extractant as a solvent or otherwise segregate thereto. The temperature and time parameters can be varied depending upon the composition of the rare earth-bearing material being treated and of the liquid metal extractant used. Illustrative parameters are set forth in the Examples herebelow.

The rare earth-bearing scrap, waste or other material and the extractant are maintained in contact at a temperature and for a time effective to extract the rare earth metal(s) from the melted alloy into the melted extractant. For convenience and energy efficiency in one embodiment of the invention, the rare earth metal-bearing material and the extractant are disposed, melted and contacted in a common melting vessel, such as a metallic or ceramic crucible. However, the invention is not so limited and can be practiced, for example, by melting the rare earth-bearing material and the extractant in separate vessels and then contacting the melted material and extractant in a separate vessel or in one of the melting vessels. In the Example herebelow, the rare earth metal-bearing material and the extractant are disposed, melted and contacted in a common conventional crucible made of tantalum at the temperature and time set forth to extract the rare earth(s) from the melted rare earth-transition metal alloy into the melted magnesium extractant.

Following extraction of the rare earth metal(s) from the scrap, waste or other rare earth-bearing material, the melt typically is solidified and the solidified melt treated to separate the rare earth metal(s) from the extractant to enable reuse of the rare earth metal(s) and recycling of the extractant in further recovery processing. For example, the melt can be solidified in-situ in the processing vessel, or poured into a suitable melt-receiving vessel, such as a crucible or mold, for solidification to a desired shape. Alternately, the melt in the molten state can be directly treated to separate the separate the rare earth metal(s) from the extractant by filtration, or density separation.

In an embodiment of the invention, either the solidified or molten melt is subjected to vacuum sublimation or distillation to separate the lower vapor pressure metal (e.g. magnesium extractant) from the higher vapor pressure metal (e.g. rare earth metal(s) such as Dy, Tb, Nd, etc.). Vacuum sublimation can be conducted in a conventional distillation apparatus of suitable material (i.e. Ta, Fe, Mo, W, etc.) wherein the solidified melt is heated and melted (or the already molten melt) is subjected to a vacuum level effective to evaporate the lower vapor pressure metal (e.g. magnesium extractant) so as to leave the higher vapor pressure metal (e.g. rare earth(s) dissolved in the extractant) for reuse. Vacuum distillation can be conducted in a conventional distillation apparatus wherein the solidified melt is heated and melted (or the already molten melt) is subjected to elevated temperature effective to evaporate the lower melting point metal (e.g. magnesium extractant) so as to leave the higher melting point metal (e.g. rare earth(s) dissolved in the extractant) for reuse.

The extractant can be recycled in the recovery process to treat additional rare earth-bearing scrap, waste or other material. The recovered rare earth metal(s) can be reused in fabrication of articles of manufacture, such as permanent magnets, for example, for recovered Nd, Dy, Tb, Sm, etc.

EXAMPLE 1

Five grams of $Nd_2Fe_{14}B$ alloy (base material) was placed with an equal weight of distilled magnesium in a tantalum crucible and the crucible was sealed and evacuated to 10 torr. The crucible contents were induction heated to 1000° C. and held at that temperature for 3 hours. After 3 hours at 1000° C., the induction coil was deenergized so that the resulting melt could solidify in-situ in the crucible to room temperature. The crucible was then sectioned and investigated metallographically. FIG. 1 is scanning electron micrograph made with a scanning electron microscope having an X-ray spectrometer for elemental analysis. Referring to FIG. 1, the region designated A comprises the base material depleted in rare earth (i.e. Nd). The region designated B comprises essentially pure magnesium. The region designated C comprises a rare earth (Nd)-magnesium alloy with minimal iron content as detected by the X-ray spectrometer. As a result of limited contact time between the molten alloy and the molten magnesium, complete dissolution of the rare earth metal (Nd) of the alloy was not achieved in the Example. However, complete dissolution can be effected by using a longer contact time and/or higher temperature in the process. The rare earth (Nd) can be separated from the Nd—Mg alloy using vacuum sublimation or distillation (see Example 3).

EXAMPLE 2

Figure 2:
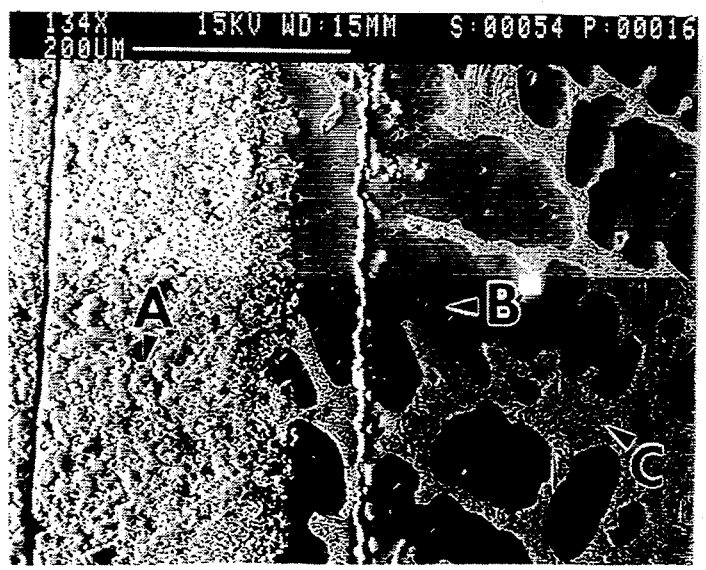
FIG. 2 is a photomicrograph at 134X of Terfenol alloy material cooled to room temperature after liquid metal extraction with molten magnesium at 1000° C. for 3 hours.

Five grams of $Dy_{0.25}Tb_{0.75}Fe$ "Terfenol" alloy (base material) was placed with an equal weight of distilled magnesium in a tantalum crucible and the crucible was sealed and evacuated to 10 torr. The crucible contents were induction heated to 1000° C. and held at that temperature for 3 hours. After 3 hours at 1000° C., the induction coil was deenergized so that the resulting melt could solidify in-situ in the crucible to room temperature. The crucible was then sectioned and investigated metallographically. FIG. 2 is scanning electron micrograph made with scanning electron microscope having an X-ray spectrometer for elemental analysis. Referring to FIG. 2, the region designated A comprises the base material depleted in rare earth (i.e. Dy, Tb). The region designated B is essentially pure magnesium. The region designated C comprises a rare earth Dy, Tb—Mg alloy with minimal iron content as detected by the X-ray spectrometer. As a result of limited contact time between the molten alloy and the molten magnesium, complete dissolution of the rare earth metal (Dy, Tb) of the alloy was not achieved in the Example and would require longer contact time and/or higher temperature in the process. The rare earth (Nd) can be separated from the Nd—Mg alloy using vacuum sublimation or distillation.

EXAMPLE 3

A rare earth magnesium alloy, Nd 45%/Mg55% by weight, was subjected to vacuum distillation. A 500 gram quantity of the alloy was heated at 800° C. in a vacuum of 10 torr for 24 hours. This was done in an induction heated Ta crucible with a W condenser disposed above the crucible to collect magnesium distillate with external heat shields separating the crucible and condenser. Chemical analysis showed quantitative separation of the alloy components; i.e. Nd with 20 ppm by weight Mg and Mg with 5 ppm by weight Nd.

While the invention has been described in terms of specific embodiments thereof, it is not intended to be limited thereto but rather only to the extent set forth in the following claims.

The embodiments of the invention in which an exclusive property or privilege is claimed are defined as follows:

1. A method of treating a rare earth metal-bearing material, comprising melting rare earth metal-bearing material comprising a rare earth metal and at least one other element that is not a rare earth metal, melting an extractant in which the rare earth metal is soluble in the molten state, and contacting the melted material and melted extractant at a temperature and for a time effective to selectively extract the rare earth metal from said melted material into said melted extractant.

2. The method of claim 1 further including separating the rare earth metal from the extractant.

3. The method of claim 2 wherein the melted extractant is solidified prior to separation of the rare earth metal therefrom.

4. The method of claim 2 further including separating the rare earth metal from the solidified extractant.

5. The method of claim 2 wherein the rare earth metal is separated from the solidified extractant by at least one of sublimation and distillation.

6. The method of claim 3 further including separating the transition metal from the solidified extractant.

7. The method of claim 1 wherein said material and said extractant are melted and contacted in a common melting vessel.

8. The method of claim 1 wherein said extractant is selected from a Group IIA metal.

9. A method of treating a rare earth metal-transition metal alloy scrap or waste material, comprising melting rare earth metal-transition metal alloy scrap or waste material comprising a rare earth metal and at least one transition metal, melting a Group IIA metal in which the rare earth metal is soluble in the molten state, and contacting the melted scrap or waste material and melted Group IIA metal at a temperature and for a time effective to selectively extract the rare earth metal from said melted scrap or waste material into said melted Group IIA metal.

10. The method of claim 8 wherein the rare earth-transition metal alloy scrap or waste material comprises Dy and Tb.

11. The method of claim 8 wherein the rare earth-transition metal alloy scrap or waster material comprises Nd and boron.

12. The method of claim 8 wherein the Group IIA metal comprises magnesium.

* * * * *